Feb. 16, 1932.  H. A. BODGE  1,845,578
BAKE OVEN
Filed May 31, 1930
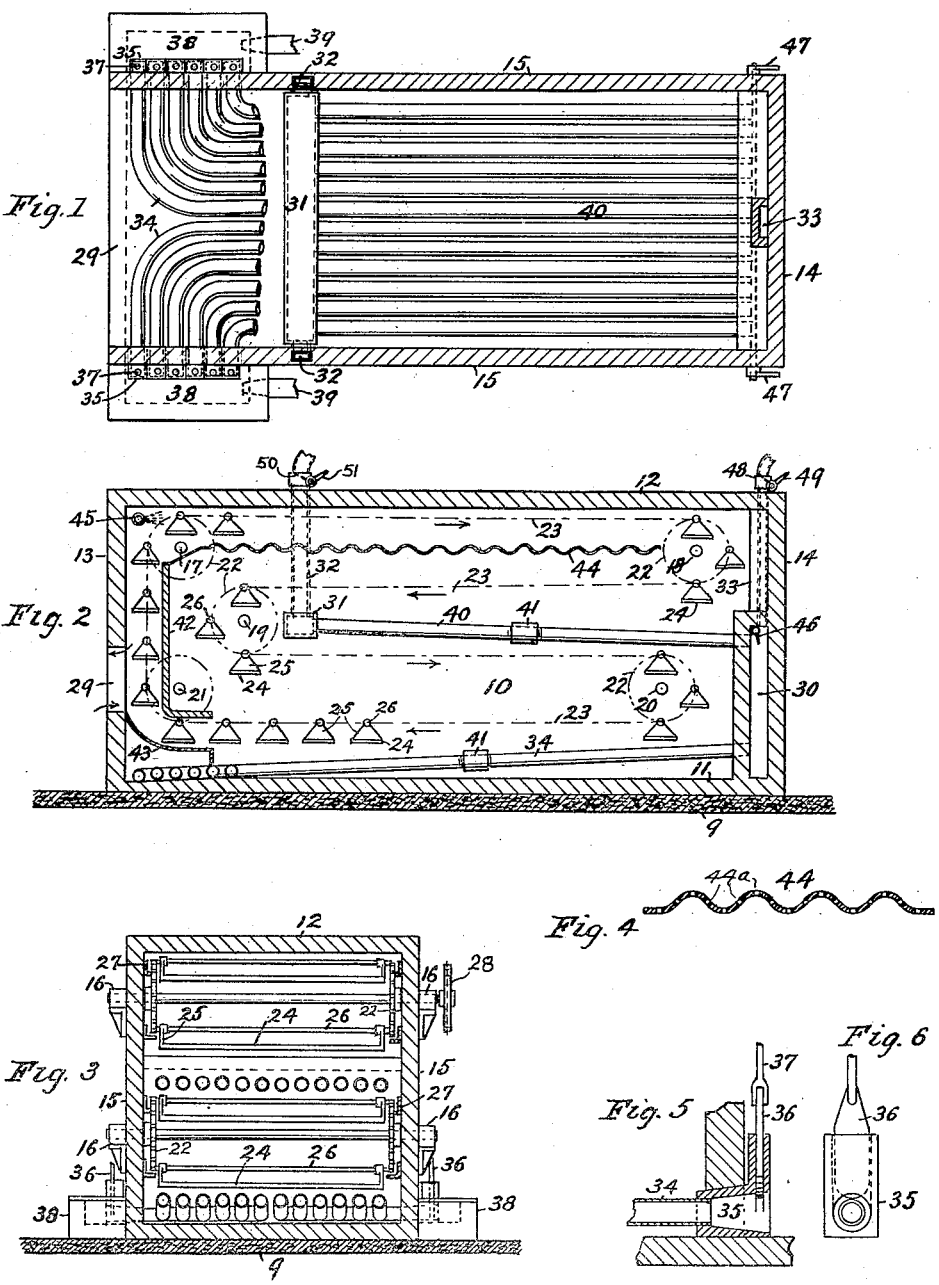
Inventor
Horace A. Bodge
By Attorney Patented Feb. 16, 1932

1,845,578

UNITED STATES PATENT OFFICE

HORACE A. BODGE, OF WHITE PLAINS, NEW YORK

BAKE OVEN

Application filed May 31, 1930. Serial No. 457,789.

The present invention relates to improvements in bake ovens of the class in which a series of trays are suspended on a continuously movable endless carrier and arranged to receive and deliver respectively the unbaked and baked loaves of bread or other food materials in a continuous manner through a common door opening in the front wall of the oven.

The objects of the present invention include means for indirectly heating the oven by the use of gas or oil burners arranged to deliver their products of combustion through a series of tubes or flues disposed within the baking chamber, thus preventing contamination of the food products by the flue gases.

The objects also include means for diffusing and controlling the flow of the hot gases and directing them into different quarters of the baking chamber to effect the desired uniform baking action.

Also, to provide an arrangement of heating tubes that may be conveniently assembled within the oven independently of one another and renewed without disturbing the oven structure.

For further comprehension of the invention, and of the objects and advantages thereof, reference is had to the following description and accompanying drawings, and to the appended claims in which the various features of the invention are more particularly set forth.

Referring to the drawings in which similar characters of reference designate like parts throughout the several views:

Figure 1 is a top plan view partially in section of a bake oven embodying my invention.

Figure 2 is a view showing a longitudinal sectional elevation thereof.

Figure 3 is a transverse sectional elevational view.

Figure 4, an enlarged detail view in section, showing a portion of a corrugated diffusion plate.

Figure 5, a sectional elevational view of a damper.

Figure 6, a face view of the damper taken at right angles to Fig. 5.

Numeral 9 of the drawings indicates a floor section on which the oven is supported, the latter comprising a baking chamber 10 formed by the respective bottom and top walls 11 and 12, and the respective front and back walls 13 and 14 and the side walls 15. Supported from the latter walls are the exterior bearings 16 in which are rotatably mounted the carrier shafts 17, 18, 19, 20 and 21, fixedly provided within the oven with the carrier wheels 22, engaged by the endless carrier chains 23, the carrier wheels and chains being indicated in dotted lines in Fig. 2 and disposed to provide for the carrier trays a plurality of horizontal paths and a vertical front path adjacent the front wall 13 of the oven.

Suspended from the chains 23 are a plurality of carrier or work trays 24 having upwardly extending side arms 25 carried upon hanger shafts 26, the latter having end rollers adapted to bear upon and travel along the angle bars 27, secured to the opposite inner faces of the side walls 15 in well-known manner. A driving wheel 28 is fixed upon an outer end of the carrier shaft 17 and is adapted to rotate the latter and operate the carrier trays in a continuous manner for the reception and delivery of the work through the common door opening 29 formed in the front wall 13 of the oven, the opening being provided with a conventional door, not shown.

Extending transversely within the baking chamber 10 at the lower rearward end thereof is a heat distributing chamber 30, and disposed between the upper and lower horizontal paths of the carrier trays at the forward end of the baking chamber is a transversely extending discharge duct 31, having at its opposite ends escape flues 32 leading upwardly through the side walls 15 of the oven. A similar escape flue 33 leads from the distributing chamber 30 upwardly and outwardly from the baking chamber.

Disposed lengthwise within the baking chamber 10 and below the lower horizontal path of the carrier trays is a lower row of heating tubes 34 arranged transversely of the oven and severally connected at their rearward ends to the distributing chamber 30. At their forward ends the tubes 34 are severally provided with bends having independent damper connections 35 leading outwardly through the opposite side walls 15 of the oven, the damper connections being provided with guiding grooves adapted to be slidingly engaged by the damper plate 36, having an operating rod 37 arranged to vertically position the plate and regulate the admission of hot gases into the tubes 34. Exterior of the opposite side walls of the oven and enclosing the damper inlets are fireboxes or combustion chambers 38 provided with burner nozzles 39 through which the source of heat supply is admitted to the tubes of the oven. A transverse row of upper heating tubes 40 extend lengthwise of the baking chamber 10 midway between the horizontal paths of the carrier trays, and are connected at their opposite ends to the distributing chamber 30 and the discharge duct 31.

The heating tubes in the upper and lower rows are severally provided with couplings 41 by means of which they may readily be assembled within the baking chamber, or disconnected therefrom in case of renewal, independently of one another and without disturbing any portion of the fixed oven structure.

At its forward end the baking chamber is provided with an upright baffle 42 that serves both to prevent a direct inflow of cold air through the lower portion of the door opening 29 and the direct escape of hot air and vapor from the chamber through the upper portion of said opening. Also, a secondary baffle 43 is provided that extends from the door opening inwardly below the lower path of the carrier trays and serves to prevent a direct inflow of cold air passing through the lower portion of the door opening into the oven, the several baffles extending transversely within the oven and preferably secured to the opposite inner faces of the side walls 15.

A corrugated diffusion plate 44 is disposed in spaced relation with the top wall 12 of the baking chamber and provides a steam space for the upper horizontal path of the carrier trays, the steam being admitted through the pipe 45, which extends transversely within the baking chamber and is provided with perforations adapted to direct jets of steam toward the rear of the oven and in the direction of the travel of the trays. The diffusion plate 44 is perforated 44a and serves to subdivide the heated air in its upward radiating movement from the heating tubes within the oven, causing it to intermingle with the steam and thus affording a desired baking condition not otherwise obtained.

In the baking operation of the oven the damper plates 36 in the fireboxes 38 may be severally adjusted by the operating rod 37 to admit heat into the lower row of tubes 34 in variable quantities and thereby laterally adjust the temperature of baking chamber along the lower horizontal travel of the carrier as may be required to effect the desired uniform baking action lengthwise of the trays. As the heated gases pass from the tubes 34 into the distributing chamber 30, any variations in temperature will tend to mingle and become uniform, and as the gases pass from the upper portion of this chamber into the upper row of tubes 40, the opposite dampers 46, disposed in line with each other and operated exteriorly of the opposite side walls of the oven by the hand levers 47, may be actuated to variably engage the inlet ends of the upper tubes and direct the heat as may be desired either equally or unequally to opposite sides of the baking chamber. An added variation in the temperature of the gases within the upper tubes 40 may be effected by regulating a free discharge of a portion of the gases through the escape flue 33 by means of the damper 48, the latter being disposed exteriorly of the oven and actuated by the handle 49. Also the heat within the upper row of tubes 40 may be furthermore regulated by opening or closing the opposite escape flues 32 by the dampers 50 actuated by the handles 51, the dampers being disposed exteriorly of the oven and in their action serving to equalize or vary the temperature of the tubes at opposite sides of the baking chamber as may be desired.

The employment of pipes for conveying the necessary heat through a bake oven is not broadly new, a common practice being to run the pipes from a suitable furnace and by various bends into different quarters of the baking chamber, a circulation of steam or hot water under considerable pressure being maintained within the pipes. In some respects this method of heating an oven has been found objectional as requiring considerable care in avoiding dangerously excessive pressures, and the repairs or replacements of the pipes which by reason of the numerous bends necessitates considerable reconstruction work on the oven structure and also the lack of variable control in directing the radient heat into the various quarters of the baking chamber, as compared with the construction herein set forth.

I claim:

1. In a bake oven having an endless series of trays movably supported in a plurality of horizontal paths therein, one above the other, a lower row of heating tubes adjacent the lower path of said trays, an upper row of heating tubes adjacent an upper path of said trays, a source of heat supply for said tubes, adjustable dampers at the inlet ends of said lower row of tubes for independently regulating the heat admitted thereto, means connecting the outlet ends of the lower row of tubes with the inlet ends of said upper row of tubes, and means for adjustably controlling the exhaust from said upper row of tubes.

2. In a bake oven having an endless series of trays movably supported therein, a row of heating tubes adjacent the path of said trays and having outlet ends extending transversely of said oven, a heat distributing chamber within said oven and connecting the outlet ends of said tubes, a source of heat supply for said tubes, means for independently regulating the heat supplied to said tubes, and a damper controlled escape flue leading from said distributing chamber.

3. In a bake oven having an endless series of trays movably supported in a plurality of horizontal paths therein, one above the other, a heat distributing chamber within said oven, a lower row of heating tubes adjacent the lower path of said trays and having outlet ends extending transversely of said oven and leading into said chamber, an upper row of heating tubes adjacent an upper path of said trays and having inlet ends extending transversely of said oven and leading from said chamber, a source of heat supply for said tubes, means for independently regulating the heat supplied to said lower row of tubes, and means within said chamber for regulating the heat supplied to said upper row of tubes.

4. In a bake oven having an endless series of trays movably supported in horizontal rows, the upper of said rows movable rearwardly within said oven, a perforated diffusion plate having corrugations and transversely disposed in said oven adjacent the path of said upper row of trays, heating means for said oven below said diffusion plate, and a steam supply pipe extending transversely of said oven and disposed to direct jets of steam rearwardly within the space formed by the upper wall of said oven and the said diffusion plate.

Signed at New York in the county of New York and State of New York this 26th day of May A. D. 1930.

HORACE A. BODGE.